…

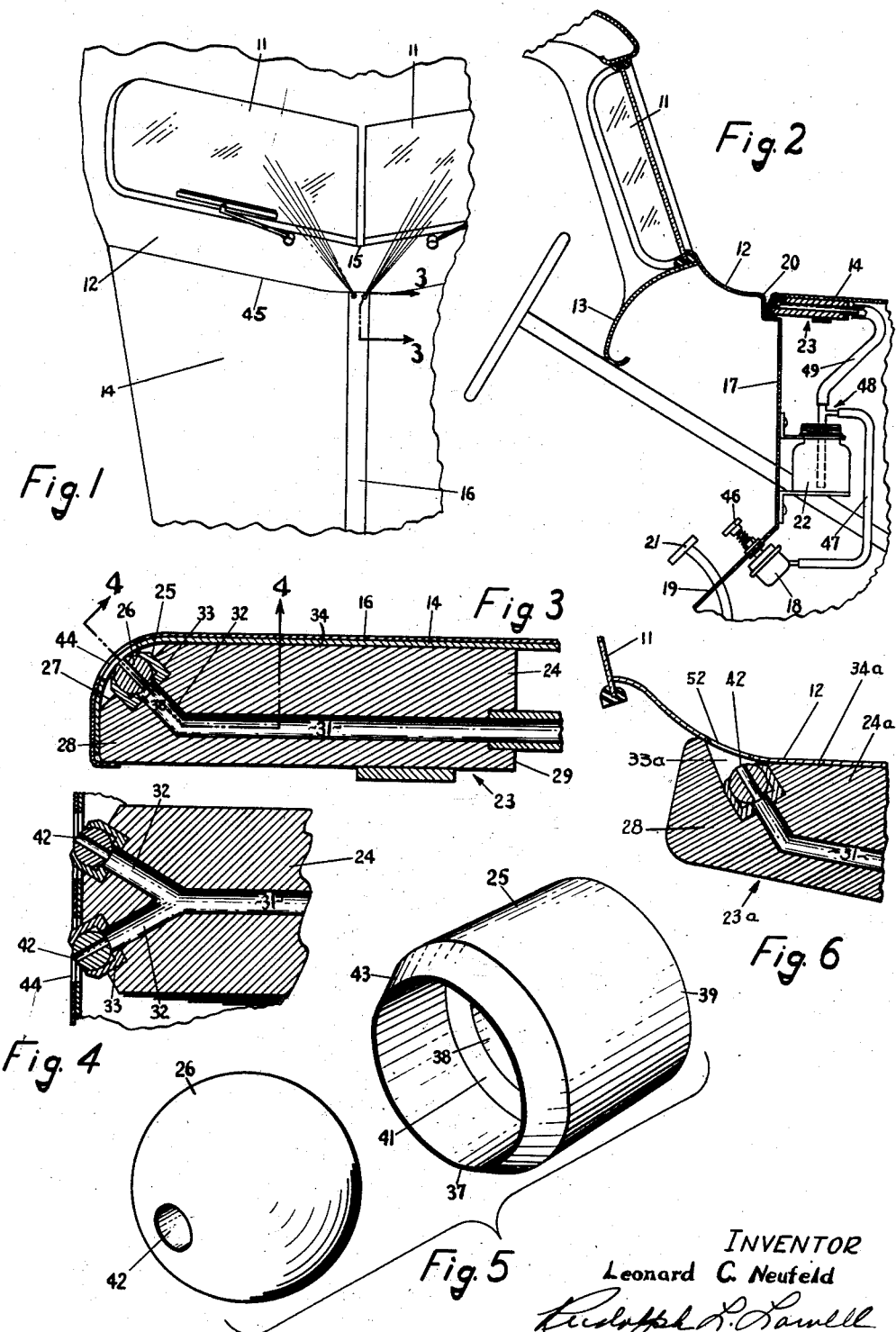
March 1, 1955 — L. C. NEUFELD — 2,703,258
NOZZLE STRUCTURE
Filed June 5, 1952
INVENTOR
Leonard C. Neufeld

United States Patent Office 2,703,258
Patented Mar. 1, 1955

2,703,258

NOZZLE STRUCTURE

Leonard C. Neufeld, Des Moines, Iowa, assignor to The Delman Company, Des Moines, Iowa, a partnership Application June 5, 1952, Serial No. 291,857

4 Claims. (Cl. 299—73)

This invention relates generally to automobile windshield clearing systems and more particularly to a nozzle unit adapted to be supported within the engine hood of the automobile for directing a stream of fluid onto the windshield.

An object of this invention is to provide an improved nozzle construction.

Another object of this invention is to provide a nozzle unit which is capable of being attached to the underside of a movable automobile hood so as to be concealed from view and not interrupt the contour of the automobile surface.

A further object of this invention is to provide a nozzle unit disposed below the top surface of an automobile engine hood and cowl assembly and installed so as to be capable of adjustment to direct a stream of fluid into the path of travel of the usual windshield wipers.

Still a further object of this invention is to provide a nozzle unit for a vehicle windshield clearing system which is adapted to be easily installed on substantially all models of automobiles and trucks having various engine hood designs and which is of a compact and rugged construction, economical to manufacture, and efficient in operation.

Further objects, features and advantages of this invention will appear from the following description when taken in connection with the accompanying drawings, in which:

Fig. 1 is a fragmentary top plan view of a vehicle windshield and engine hood showing the position of the nozzle unit on the hood;

Fig. 2 is a fragmentary fore-shortened longitudinal sectional view of a vehicle showing a windshield washer embodying the nozzle unit of this invention assembled thereon;

Fig. 3 is an enlarged longitudinal sectional view of the nozzle unit taken along the line 3—3 in Fig. 1;

Fig. 4 is a sectional view as seen along the line 4—4 in Fig. 3;

Fig. 5 is an exploded perspective view of the nozzle construction; and

Fig. 6 is a view similar to Fig. 3 showing a modified form of the invention, in which the nozzle unit is mounted on the engine cowl.

With reference to the drawing, there is illustrated in Figs. 1 and 2 a windshield clearing system as applied to an automobile having a two piece windshield 11, an engine cowl 12 curved downwardly and forwardly from the lower front edge 15 of the windshield, and an instrument panel or dashboard 13 located rearwardly of the windshield 11. Extending forwardly from and spaced from the forward edge 20 of the engine cowl 12 is a usual movable hood structure 14 having ornamental strip 16. The automobile is further equipped with the usual firewall 17 and an upwardly and forwardly inclined floorboard section 19 which joins with the lower end of the firewall 17.

The windshield washer includes a pump unit 18 supported from the floorboard portion 19 at a position adjacent to the vehicle clutch pedal 21 and a liquid glass container or reservoir 22 carried on the front side of the firewall 17.

The nozzle or fluid discharge unit of this invention, indicated generally at 23, consists of a body member 24 having a pair of tubular members 25 disposed in one end thereof and a pair of ball members 26 received within the tubular member 25.

The body member 24 is of an elongated generally rectangular shape having a beveled rear top edge 27. In its front end 29, body member 24 is formed with a longitudinal inlet passage 31 having fluid communication with a pair of rearwardly diverging fluid passages 32 which terminate in enlarged sections or cavities 33 coaxial with the passages 32. The cavities 33 are located at transversely spaced positions on the beveled portion 27 of the body member 24, the top surface 34 of which is formed such that its shape is complementary to the shape of the underside of the engine hood 14, so that the body member 24 can be attached directly to and closely adjacent to the underside of the engine hood 14.

Each tubular member 25, at its inner or rear end 39, is formed with a section 38 of a reduced diameter corresponding in size to the diameter of a passage 32. As a result when a tubular member 25 is pressed into a cavity 33 the reduced section 38 is in axial alignment with and in a flush registration with its corresponding passage 32.

It can thus be seen that by virtue of the press-fit of the tubular members 25 within the cavities 33 in the body member 24, the tubular members 25 constitute an integral part of the body member 24.

Adjustably carried within the forward end 37 of each tubular member 25 is a ball member 26, which is formed with a fluid passage, or discharge orifice 42 axially therethrough. Each ball member 26 is of substantially the same diameter as the inner diameter of a tubular member 25 and is pressed therein to a stop position defined by its abutting engagement with the shoulder or stop portion 41 formed by the reduced section 38. The stop portion 41 is positioned from the forward end 37 of the tubular member 25 a distance greater than the radius but less than the diameter of the ball member 26 so that one end of the ball member 26 projects beyond the end 37, which is tapered as indicated at 43. To frictionally and adjustably retain the ball member 26 within the tubular member 25, the tapered end 37 is swaged or deformed into contact engagement with the ball member 26, so that by merely inserting a pin or the like within the passages 42, the ball members 26 can be swiveled to direct a spray of liquid in a desired direction.

The nozzle unit 23 is attached to the underside of the movable hood 14 so that the body member 24 is positioned along the longitudinal center line of the engine hood 14 with the beveled edge 27 of the body member 24 adjacent the rear edge 45 of the engine hood 14. The ornamental strip 16, which extends along the top side of the longitudinal center line of the engine hood 14, is bent downwardly over the beveled portion 27 of the body member 24 and is attached to the rear end 28 of body member 24. A portion of the ornamental strip 16 overlying the ball members 26 is provided with openings 44 to leave an unobstructed path between the fluid passages 42 and the windshield 11. The body member 24 can then be attached by bolts, welding or the like to the underside of the engine hood 14.

Of course it is to be understood that it is not necessary in this form of the invention that the ornamental strip 16 be bent downwardly to conceal the ball members 26 since this is a feature which is directed to the appearance of the automobile and not the operativeness of the clearing system. It is only necessary that a space be provided between the forward edge 20 of the engine cowl 12 and the rear edge 45 of the engine hood 14 to give a clear path to the fluid jets discharged from the nozzle unit 23.

In the operation of the windshield clearing system, a foot operated plunger 46 for the pump 18 is actuated to force fluid under pressure through a flexible tube 47 and into a three way valve 48 which is opened by the fluid pressure to admit the fluid into a flexible tube 49 that is attached to the fluid passage 31 in the body member 24. Fluid under pressure from the passage 31 is then discharged from the ball member fluid passages 42 as jets of fluid directed against the windshield 11. When the plunger 46 is released, fluid is drawn from the reservoir 22 into the pump 18. In other words fluid is discharged from the ball member passages 42 when the plunger 46 is depressed and drawn into the pump 18, for subsequent discharge, when the plunger 46 is released.

A modified form of the invention is illustrated in Fig. 6 in which a nozzle unit 23a is applied to the engine cowl 12. The nozzle or fluid discharge unit 23a in this form of the invention is similar to the nozzle unit 23 shown in Fig. 3 except that the body member 24a has its top surface 34a of a shape to conform to the contour of the cowl 12. When the surface 34a is flush with the underside of the engine cowl 12, the fluid passages 42 are inclined upwardly and rearwardly to thus be directed toward the windshield 11. An opening 52 is provided in the cowl 12 to leave an unobstructed path to the windshield for fluid discharged from the fluid passages 42. The rear end 28 of the body member 24a is formed with cavities 33a terminating in the top surface 34a of the body member 24a such that an enclosure is formed about the underside of the cowl opening 52.

From the above description it is seen that a compact nozzle unit has been provided which can be attached directly to the underside of either the cowl or hood of an engine hood and cowl assembly. The nozzle unit is closely adjacent the windshield 11 and concealed from view so as not to impair the over-all appearance of the automobile.

Although the invention has been described with respect to preferred embodiments thereof, it is to be understood that it is not to be so limited since changes can be made therein which are within the full intended scope of this invention as defined by the appended claims.

I claim:

1. A discharge nozzle comprising a tube member, stop means on the inner surface of said tube member intermediate the ends thereof, an axially bored ball member of a diameter substantially equal to the inner diameter of said tube member positioned in one end of said tube member and against said stop means, and said last mentioned end of said tube member being formed in contact engagement with said ball member to retain the ball member within said tubular member.

2. For use in a windshield clearing system, a body member having a substantially Y-shape fluid passage formed therein, said passage having a pair of ends terminating in a spaced relation on a surface portion of said body member, and a third end constituting an inlet and said pair of ends outlets, said surface portion being formed with annular cavities concentric with and having their bottom walls open to said outlets, a pair of ball members corresponding to said cavities of a diameter substantially equal to the diameter of said cavities disposed within said cavities and adapted to rest on said bottom walls, said cavities being of a depth greater than the radius of but less than the diameter of said ball members so that said ball members project from the open ends of said cavities, the edges of the side walls of said cavities at said surface portion being deformed into engagement with said ball members to frictionally retain said ball members in said cavities, said ball members having axial openings for communication with said outlets.

3. For use in a windshield clearing system, a body member having a fluid passage formed therein, with said passage having an outlet end terminating on a surface portion of said body member, said surface portion being formed with an annular cavity concentric with and having the bottom wall thereof open to said outlet, an axially bored ball member of diameter substantially equal to the diameter of said cavity disposed within the cavity and adapted to rest on said bottom wall, said cavity being of a depth greater than the radius of but less than the diameter of said ball member so that the ball member projects from the open end of said cavity, and with the side walls of said cavity at said surface portion being deformed into engagement with said ball member to frictionally retain said ball member in said cavity.

4. A discharge nozzle comprising a tube member, having an inlet end and an outlet end, stop means on the inner surface of said tube member intermediate the ends thereof, an axially bored ball member of a diameter substantially equal to the inner diameter of said tube member positioned within said tube member at said outlet end, with the distance between said outlet end and said stop means being less than the diameter of and greater than the radius of said ball member, and with said outlet end of the tube member being formed in contact engagement with said ball member to retain the ball member within the tube member and against said stop means in a position such that said ball member projects from said outlet end of the tube member.

References Cited in the file of this patent

UNITED STATES PATENTS

| 2,114,558 | Dismukes | Apr. 19, 1938 |
| 2,289,650 | Horton | July 14, 1942 |
| 2,576,435 | Bachrach | Nov. 27, 1951 |
| 2,622,929 | Neufeld | Dec. 23, 1952 |

FOREIGN PATENTS

| 447,043 | Great Britain | May 5, 1936 |